United States Patent [19]

Budinger et al.

[11] Patent Number: 5,523,170

[45] Date of Patent: Jun. 4, 1996

[54] REPAIRED ARTICLE AND MATERIAL AND METHOD FOR MAKING

[75] Inventors: David E. Budinger, Milford; Jim D. Reeves, Cincinnati; Robert A. Anderson, Loveland, all of Ohio

[73] Assignee: General Electric Company, Cincinnati, Ohio

[21] Appl. No.: 364,915

[22] Filed: Dec. 28, 1994

[51] Int. Cl.$^6$ .............................. B22F 7/04; B22F 5/04; B22F 1/00

[52] U.S. Cl. .............................. 428/551; 75/255; 419/54; 419/8; 419/9; 419/60; 428/552; 428/553; 428/564

[58] Field of Search .................... 428/551, 552, 428/553, 564; 75/255; 419/8, 9, 54, 53, 60

[56] References Cited

U.S. PATENT DOCUMENTS

| | | | |
|---|---|---|---|
| 4,073,639 | 2/1978 | Duvall et al. | 75/255 |
| 4,116,723 | 9/1978 | Gell et al. | 148/404 |
| 4,379,120 | 4/1983 | Whitney et al. | 148/410 |
| 4,830,934 | 5/1989 | Ferrigno et al. | 428/678 |
| 4,910,098 | 3/1990 | Lee et al. | 428/680 |
| 5,040,718 | 8/1991 | Lee et al. | 228/119 |
| 5,098,470 | 3/1992 | Wood et al. | 75/255 |
| 5,156,321 | 10/1992 | Liburdi et al. | 228/119 |
| 5,240,491 | 8/1993 | Budinger et al. | 75/255 |
| 5,403,546 | 4/1995 | Khan et al. | 420/448 |

*Primary Examiner*—Donald P. Walsh
*Assistant Examiner*—John N. Greaves
*Attorney, Agent, or Firm*—Andrew C. Hess; David L. Narciso

[57] ABSTRACT

An article with a high temperature superalloy body having a directionally oriented microsuucture and a structural discontinuity, such as a crack, or surface erosion or wear portion, is repaired, to provide a repaired article, using a mixture of Ni base ahoy powders. One powder includes a careful balance of the temperature depressants Si and B. In the one powder, Si is included in the range of about 0.05–2.2 wt. % to provide about 0.02–1.3 wt. % Si in a repaired portion as bonded with the article. In that same powder, B is include in the range of about 0.2–1.2 wt. % to provide about 0.08–0.7 wt. % in that repaired portion. In the repair method, the repaired portion can be provided, when shorter brazing times are used, with improved mechanical properties by diffusing the brazed alloy and aging the repaired structure in the range of about 1600°–1700° F. for a time in the range of about 1–16 hours.

12 Claims, No Drawings

REPAIRED ARTICLE AND MATERIAL AND METHOD FOR MAKING

FIELD OF THE INVENTION

This invention relates to repaired articles and to materials and methods for making. More particularly, it relates to the repair of an article having a high temperature superalloy body in which there is a structural discontinuity such as a crack or a wear or erosion portion.

BACKGROUND OF THE INVENTION

As the gas turbine engine art developed, the high temperature technology advanced and more sophisticated materials and air cooled components were provided to withstand more strenuous high temperature operating conditions. One example of such area of development related to turbine components such as blades and vanes and their associated members such as shrouds. During operation, such articles experience severe temperature and environmental conditions as well as high thermal stresses, some of which result from proximity of the article body to cooling passages.

One aspect of such area was the development of articles of nickel base superalloys, particularly those manufactured to have a directionally oriented microstructure. Generally, these microstructures are referred to as having directionally elongated grains from directional solidification of the body during casting, or as having a substantially single crystal structure as a result of selecting a single grain for solidification during casting along with directional removal of heat during solidification from a melt to grow the single crystal.

It will be appreciated that use of such materials and manufacturing methods resulted in a costly article. Generally such articles include one or more coatings, or surface or edge coverings for environmental protection, erosion control, sacrificial abrasion, etc. If, during manufacture or as a result of operation in an engine, a structural discontinuity, such as a crack, or a wear or erosion area, occurred in a surface portion of the article, it was deemed more desirable and more cost effective to repair rather than replace the article.

Prior to the present invention, repair methods and materials have been reported for repair of articles made from superalloys such as those generally known in the art as nickel base superalloys. However, particularly with regard to articles having bodies of a directionally oriented microstructure operating at temperatures higher than those earlier reported components, known repair systems were inadequate. For example, they were not balanced for repair of an article manufactured to include a protective surface system of some kind. The known repair system was not controlled for "burnout capability"—control of the lowest melting point component or phase of the repair system. For example: if a brazing alloy used in manufacture was a multiple powder system, a lower melting phase would melt during subsequent repair coating or operation; if the repair system attempted to include a higher brazing temperature to withstand such higher temperature operation, the brazing temperature was so high, or the required brazing time at temperature was so long, as to result in recrystallization of the microstructure of the body being repaired, thereby reducing mechanical properties of the body. Some reported brazing systems attempted to match the composition of the repair alloy to the composition of the article. Others used melting point depressants which avoided use of such elements as Si which, in the known compositions, were seen to be detrimental to mechanical properties.

SUMMARY OF THE INVENTION

The present invention, in one form, provides a repaired article which can be used in strenuous oxidizing environments up to at least about 2200° F. The article comprises a high temperature superalloy body, for example, a nickel base superalloy, having a directionally oriented microstructure and a recrystallization temperature of at least about 2275° F., the body having a structural discontinuity at a surface portion thereof. Diffusion bonded with the surface portion at the discontiuity is a substantially equiaxed nickel base repair alloy capable of exposure to at least about 2250° F. with substantially no reflow of a lower melting phase and having a bonding temperature range no greater than, and predominantely less than, the recrystallization temperature of the body. The repair alloy, as bonded with the surface portion, is characterized by the presence of the combination of Si and B in the ranges, by weight, of about 0.02–1.3% Si and about 0.08–0.7% B, the repair alloy further comprising, by weight, about: 8–17% Cr, 4–7% Al, 0.5–1.5% Ti, 0.5–1.5% Mo, 4–6% Ta, 2–4% W, 0.5–2% Hf, 0.05–0.165 C, 0.02–0.1% Zr, 6–18% Co, with the balance Ni and incidental impurities.

In another form, the present invention comprises a repair system of about 40–60 weight % of a first Ni base alloy powder having a first melting range, the balance being a second Ni base alloy powder having a second melting range less than the first melting range. Each of the first and second alloy powders comprises, by weight, about: 8–17% Cr, 4–7% Al, 0.5–1.5% Ti, 0.5–1.5% Mo, 4–6% Ta, 2–4% W, 0.5–2% Hf, 0.05–0.16% C, 0.02–0.1% Zr, 6–18% Co, with the balance Ni and incidental impurities, the second alloy powder further characterized by the presence, by weight, of about 0.05–2.2% Si and about 0.2–1.2% B. In a more specifically preferred form for use in the repair of a nickel base superalloy article having a substantially single crystal microstructure, each of the first and second alloy powders comprises, by weight, about 9–11% Cr, 5.7–6.3% Al, 0.8–1.2% Ti, 0.8–1.2% Mo, 4.7–5.3% Ta, 2.8–3.2% W, 1.4–1.7% Hf, 0.09–0.13% C, 0.03–0.07% Zr, 11–13% Co,, with the balance Ni and incidental impurities, the second alloy powder further characterized by the presence, by weight, of about 1.7–2.0% Si and about 0.9–1.1% B.

The present invention includes the combination of the above described article with an additional repair coating, or coatings, such as for sacrificial wear on an abrading surface, or for additional environmental protection.

The method form of the present invention can include the steps of diffusion and aging the repaired article to stabilize the microstructure, such as by additional gamma prime phase precipitation.

DESCRIPTION OF THE PREFERRED EMBODIMENTS

One article or component to which the present invention relates is a gas turbine engine turbine shroud. In a high pressure turbine of a gas turbine engine, to improve efficiency and achieve more effective use from the expanding gases, it is desirable to minimize leakage of such hot gases around the tips of the turbine blades, between a cooperating shroud, generally carrying a seal surface. Such leakage is controlled by minimizing the clearance between the blade tips and the seal surface. Because the shroud is air cooled in advanced apparatus, it can be operated at temperatures above about 2200° F. and is exposed to considerable thermal stress. This can result, for example from cyclic operation, in cracking around shroud cooling passages and in certain areas of the seal portion.

Known shrouds have been repaired using a brazing or sintering technique, or both. However, effective repair of advanced higher temperature operating shrouds, particularly those made from nickel base superalloys having a directionally oriented microstructure, requires a different kind of technique and materials. Generally known materials for related repairs have attempted to avoid the use of Si as a temperature depressant because of its adverse effect on mechanical properties of the completed, repaired article. Some known repair alloys or mixtures tolerate, at most, a small, optional amount of Si, for example as an impurity or as a small amount of a temperature depressant.

The present invention requires the presence of a particularly selected amount of Si, in the range of about 0.02–1.3 wt. % in the final repair alloy bonded on the article, and in the range of about 0.05–2.2 wt. % in one of a plurality of alloy powders used in the practice of the present invention. Si content is balanced with the temperature depressant B, included in the range of about 0.08–0.7 wt. % in the final repair alloy bonded on the article, and in the range of about 0.2–1.2 wt. % in the alloy powder in which the Si is required. This balance of Si and B, in the alloy combination specified, provides a balance of temperature depressants which is sufficient to control brazing temperature and which does not adversely affect mechanical properties, particularly in connection with the repair of directionally oriented nickel base superalloy articles.

The present invention, in its form as a repair powder, provides a mixture of at least two nickel base alloy powders blended to form a powder mixture the brazing temperature of which is balanced to avoid recrystallization of the directionally oriented substrate body and to allow the addition of a coveting coating or other materials. The elements Si and B both are included in one of the alloy powders. During evaluation of the present invention, a variety of alloy powders were studied, leading to the selection of the alloy, mixture and method of the present invention. One preferred form, identified as alloy G, was selected from flowstudies conducted at about 2300° F. for about 20 minutes, and subsequent metallographic evaluation. Alloy G was a blend or mixture in the range of about 40–60 wt % ( specifically nominally 50 wt. % ) of a first alloy powder, NV-H1, consisting essentially of, by weight, of about 11–13% Co, 9–11% Cr, 5.7–6.3% Al, 0.8–1.2% Ti, 0.8–1.2% Mo, 4.7–5.3% Ta, 2.8–3.2% W, 1.4–1.7% Hf, 0.09–0.13% C, 0.03–0.07% Zr, 11–13% Co, with the balance Ni and incidental impurities; and in the range of about 40–60 wt % ( specifically nominally 50 wt. % ) of a second alloy powder, N51, consisting essentially, by weight, of the same composition as the above defined first alloy powder NV-H1 but with the inclusion of about 1.7–2.0% Si, and about 0.9–1.1% B, representative of the present invention.

To evaluate mechanical properties of an article repaired using the above described mixture of alloy powders, tensile and stress rupture testing was performed. Testing was conducted on butt-joint configuration specimens of a nickel base single crystal superalloy, sometimes referred to as N5 alloy, and consisting, nominally by weight, of 7.5% Co, 7% Cr, 6.2% Al, 0.004% B, 1.5% Mo, 6.5% Ta, 5% W, 0.15% Hf, 0.05% C, 3% Re, with the balance Ni and incidental impurities. The specimens included a gap either of 0.010" or of 0.040" and were prepared in accordance with the following heat treatment cycle:

| | |
|---|---|
| Braze | 2285–2315° F./20 minutes |
| Diffuse | 2075–2125° F./2 hours + 2150–2200° F./2 hours |
| Simulate Aluminide Coating | 1975° F./4 hours |
| Age (when used) | 1650° F./4 hours |

The test results showed that the repaired article resulting from use of this repair alloy system had properties at least comparable to an article repaired using known alloy systems at lower brazing temperatures, but without detrimental effect on the single crystal substrate. For example, for specimens with a 0.01" gap, the average tensile properties at 1900° F. was 40.2 ksi (thousands of pounds per square inch) for UTS (ultimate tensile strength), 43.7 ksi for 0.2% YS (yield strength), and 0.15% Elongation. Average stress rupture strength results are presented in the following table:

| Average Stress Rupture Test Results | | | | |
|---|---|---|---|---|
| Gap | Temp (°F.) | Stress (ksi) | Hrs. to Failure | Comments |
| 0.04 | 2000 | 4 | 22.0 | no age |
| 0.04 | 2000 | 4 | 44.2 | age |
| 0.01 | 2000 | 4 | 28.1 | no age |
| 0.01 | 2000 | 4 | 96.4 | age |
| 0.04 | 1700 | 25 | 41.8 | age |
| 0.01 | 1700 | 25 | 76.8 | age |

In the above-described stress rupture testing, specimens were compared for the effects of aging on the finished structure. It can be seen from the above table that, when using a relatively short brazing time, for example, about 20 minutes to 1 hour, aging can provide 2 to 3 times more stress rupture life than unaged specimens. Such aging, for example to provide increased gamma prime phase precipitation for strengthening, can be conducted in the range of about 1600–1700° F. for about 1–16 hours to adjust the microstructure for strength control. However, it has been observed that when a longer braze time, for example about two hours at about 2300° F. is used, comparable mechanical properties can be achieved without separate diffusion and aging steps. Therefore, the diffusion and aging steps can be eliminated under such condition.

The alloy mixture of the present invention was compared with properties of another repair alloy system, Alloy D, currently used to repair high temperature gas turbine engine components made from directionally solidified or oriented materials. Alloy D brazes at about 2215° F. therefore, Alloy D's brazing and remelt temperatures were too low for use with the higher temperature directionally oriented superalloy articles with which the present invention can be used: Alloy D would remelt or flow, at least incipiently, at the temperatures used to manufacture, repair or reprocess the higher melting directionally oriented articles such as those made from the above identified N5 single crystal superalloy. Alloy D was a mixture of alloy powders, the mixture having a nominal composition, by weight, of about: 18.3% Cr, 25.4% Co, 2.2% Ta, 4% Ti, 2.3% Al, 1% Cb, 0.5% Mo, 2.1% W, 0.05% Hf, 1.1% B, with the balance Ni and incidental impurities.

The stress rupture properties of the present invention were comparable to those resulting from use of known Alloy D which had a stress rupture life of about 50 hours for a comparable specimen with a gap of 0.04" at 2000° F. at 4 ksi stress. However, the oxidation resistance of the present invention was significantly better, as represented by Alloy G, compared with known Alloy D. For example, static oxidation testing on slotted N5 Alloy coupons with a 0.04" wide slot filled with the tested alloys showed a general attack to a depth of about 0.004" for Alloy D after exposure at 2000° F. for 300 hours. By way of comparison, Alloy G, representative of the present invention, exhibited that same level of general attack to a depth of about 0.004" after a more strenuous exposure at the higher temperature of 2150° F. for the longer time of 500 hours. In addition, from the results of dynamic oxidation testing at Mach 1 at 2150° F. for 100 hours on N5 Alloy test pins with a 0.020" wide slot in the pin tip, it was concluded that Alloy G, representative of the present invention, has a 75° F. better dynamic oxidation resistance than does known Alloy D.

As was stated above, the alloy powders in the powder mixture of one form of this invention is carefully balanced to provide a homogeneous final structure along with desired mechanical and environmental properties. At the same time, it has the melting/brazing temperature which is compatible with superalloy articles manufactured with a directionally oriented microstructure. This balance enables subsequent processing such as coating or the application of additional surfaces while substantially avoiding detrimental amounts of recrystallization of the substrate body microstructure.

One key to such balance is the combination of Si and B for control of melting characteristics, in the presence of particular amounts of Al and Cr to provide oxidation resistance without adversely affecting flowability. For Si, an element generally avoided in these kinds of alloys because of its erosive characteristics and adverse effect on mechanical properties, less than 0.05 wt. % in the second alloy powder (0.02 wt. % total in the brazed mixture) provides insufficient melting point depression in the balance with B. Greater than about 2.2 wt. % Si in the second alloy powder (1.3 wt. % total in the brazed mixture) can be detrimental to mechanical properties because of its diffusion characteristics. For B, less than about 0.2 wt. % in the second alloy powder in which Si is present (0.08 wt. % total in the brazed mixture) provides insufficient melting point depression. Greater than about 1.2 wt. % B in the second powder (0.7 wt. % total in the brazed mixture) can adversely affect oxidation resistance.

In both alloy powders, in one form of the present invention, Al at greater than about 7 wt. % can lead to flowability problems, whereas below about 4 wt. % Al can result in loss of adequate oxidation resistance. Cr, in combination with Al, at less than about 8 wt. % provides insufficient oxidation resistance in the presence of the above described range for B. Cr at greater than about 17 wt. % can form sigma phase needles which are embrittling and can be a crack initiator.

The element Ti in combination with Al is a gamma prime phase former. At less than about 0.5 wt. %, Ti is an insufficient gamma prime former whereas greater than about 1.5 wt. % Ti can have a detrimental effect on oxidation resistance.

The elements Mo, Ta, and W are included as solid solution strengtheners. Mo at less than about 0.5 wt %, Ta at less than about 4 wt. %, and W at less than about 2 wt. %, in combination, provide insufficient solid solution strengthening in the present invention. In addition, Mo at greater than about 1.5 wt. % tends to increase the melting point of the system, thereby counteracting the balanced combination of Si and B. Also, such elevated amount of Mo in the alloy system of this invention can adversely affect oxidation resistance. W at greater than about 4 wt. % and Ta at greater than about 6 wt. % have the same type of adverse effect as does Mo but not as intense.

Also included in the composition according to this invention are Hf, C, and Zr. Hf helps the adhesion of oxide scale and, along with C and Zr, are grain boundary strengtheners for the equiaxed repair alloy associated with the present invention. Less than about 0.5 wt. % Hf has insufficient effect on oxide scale adhesion; above about 2 wt. % Hf can form hafnides which can reduce oxidation resistance. Less than about 0.05% C and less than about 0.02 wt. % Zr are insufficient grain boundary strengtheners for the equiaxed brazed structure resulting from practice of this invention. Greater than about 0.16 wt % C and greater than about 0.1 wt. % Zr can lead to the formation of continuous grain boundary precipitates which can lead to embrittlement of the brazed structure.

The balance of the composition is Co and Ni, with Co in the range of about 6–18 wt % forming a mismatch in the Ni lattice for matrix strengthening.

In the method associated with the present invention, the surface of an article to be repaired, if it has been exposed to high temperature oxidizing conditions, first is cleaned to remove oxides on the surface and within any cracks in the surface. One method for such cleaning is frequently referred to as fluoride ion cleaning, one form of which is described in U.S. Pat. No. 4,098,450— Keller et al, patented Jul. 4, 1978, and assigned to the assignee of the present invention. The disclosure of that patent is hereby incorporated herein by reference. After cleaning, the powder mixture of the present invention is applied to the article surface to be repaired. For convenience of application, the powder is prepared as a slurry with a binder which will decompose during processing without leaving a residue. During evaluation of the present invention, a commercially available product identified as Vitta Gel material was used at a concentration of about 10–15 wt % of the powder mixture.

After application of the powder mixture, the article was heated in a non-oxidizing atmosphere at a temperature in the range of about 2275°–2325° F. for between ¼–2 hours, the time determined to minimize recrystallization of a single crystal substrate or body. Thereafter, when shorter brazing times such as about 20 minutes to about 1 hour was used, the article was heated in a non-oxidizing atmosphere to diffuse the repair system into the article body and to diffusion bond it therewith. Such diffusion included heating at a temperature in the range of about 2075°–2125° F. for about 1–4 hours followed by heating at a temperature in the range of about 2150–2200° F. for about 1–4 hours to provide a repaired structure. When longer brazing tinges such as between about 1–2 hours was used, diffusion was eliminated. If a protective coating, or a system of protective and/or abrasion coating are required, they then are applied. In order to enhance mechanical properties, according to the present invention as described above, the article including the repaired structure then can be heated in a non-oxidizing atmosphere at a temperature in the range of about 1600–1700° F. to age the microstructure.

From the above, it can be seen that the alloy powders and mixture associated with the present invention is a careful balance of the elements, in the ranges described, for use with and the repair of a superalloy article having a body with a directionally oriented microstructure, particularly a single crystal. Although the present invention has been described in connection with specific examples and embodiments, those skilled in the arts to which it relates will recognize that the present invention is capable of other variations and modifications within its scope. Such examples and embodiments are intended to be typical and representative of, rather than in any way limiting on, the scope of the present invention as presented in the appended claims.

We claim:

1. A repaired article for use in an oxidizing environment at temperatures of up to at least about 2200° F., comprising:

a body of a high temperature superalloy having a directionally oriented microstructure and a recrystallization temperature of at least about 2275° F., the body having a structural discontinuity at a surface portion thereof; and, a substantially equiaxed repair alloy diffusion bonded with the surface portion at the structural discontinuity, the repair alloy being capable of exposure to at least about 2250° F. with substantially no reflow of a lower melting phase of the repair alloy and having a bonding temperature range predominantely less than the recrystallization temperature of the body;

the repair alloy as bonded with the surface portion being characterized by the presence of the combination of Si and B in the ranges, by weight, of about 0.02–1.3% Si and about 0.08–0.7% B, the repair alloy further comprising, by weight, about: 8–17% Cr, 4–7% Al, 0.5–1.5% Ti, 0.5–1.5% Mo, 4–6% Ta, 2–4% W, 0.5–2% Hf, 0.05–0.16% C, 0.02–0.1% Zr, 6–18% Co, with the balance Ni and incidental impurities.

2. The article of claim 1 in which the repair alloy as bonded with the surface portion comprises, by weight, about: 0.2–1.3% Si, 0.08–0.7% B, 9–11% Cr, 5–7% Al, 0.6–1.3% Ti, 0.7–1.2Mo, 4.5–5.7% Ta, 2.6–3.4% W, 1.2–2% Hf, 0.05–0.16% C, 0.02–0.08% Zr, 10–14% Co, with the balance Ni and incidental impurities.

3. The article of claim 2 in which the repair alloy as bonded with the surface portion comprises, by weight, about: 0.6–1.2% Si, 0.3–0.7% B, 9.5–10.5 % Cr, 5.7–6.3% Al, 0.8–1.2% Ti, 0.8–1.2% Mo, 4.7–5.3% Ta, 2.8–3.2% W, 1.4–1.7% Hf, 0.09–0.13% C, 0.03–0.07% Zr, 11–13% Co, with the balance Ni and incidental impurities.

4. The article of claim 1 in which:

the repair alloy is the product of interdiffusion of a powder mixture of about 40–60 weight % of a first alloy powder having a first melting temperature range, the balance of the mixture being a second alloy powder having a second melting temperature range less than the first melting temperature range;

each of the first and second alloy powders comprising, by weight, about: 8–17% Cr, 4–7% Al, 0.5–1.5% Ti, 0.5–1.5% Mo, 2–4% Ta, 2–4% W, 0.5–2% Hf, 0.05–0.16% C, 0.02–0.1% Zr, 6–18Co, with the balance Ni and incidental impurities;

the second alloy powder further characterized by the presence, by weight, of about 0.05–2.2% Si and about 0.2–1.2% B.

5. The article of claim 4 in which:

each of the first and second alloy powders comprise, by weight, about: 9.5–10.5% Cr, 5.7–6.3% Al, 0.8–1.2% Ti, 0.8–1.2% Mo, 4.7–5.3% Ta, 2.8–3.2% W, 1.4–1.7% Hf, 0.09–0.13% C, 0.03–0.07Zr, 11–13% Co, with the balance Ni and incidental impurities;

the second alloy powder further characterized by the presence, by weight, of about 1.7–2.0% Si and about 0.9–1.1% B.

6. The article of claim 1 comprising, in addition:

a first coating alloy diffusion bonded with the repair alloy and characterized by good oxidation resistance and abradability with respect to an opposing member;

the first coating having an application temperature no greater than the bonding temperature range of the repair alloy.

7. The article of claim 6 comprising, in addition:

a second coating alloy diffusion bonded with the first coating alloy and characterized by good oxidation resistance;

the second coating alloy comprising an aluminide interdiffused with the first coating alloy.

8. A powder mixture of about 40–60 weight % of a first alloy powder, the balance of the mixture a second alloy powder;

the first alloy powder having a first melting temperature range and the second alloy powder having a second melting temperature range less than the first melting temperature range;

each of the alloy powders comprising, by weight, about: 8–17% Cr, 4–7% Al, 0.5–1.5% Ti, 0.5–1.5% Mo, 4–6% Ta, 2–4% W, 0.5–2% Hf, 0.05–0.16% C, 0.02–0.08% Zr, with the balance Ni and incidental impurities;

the second alloy powder further characterized by the presence, by weight, of about 0.05–2.2% Si and about 0.2–1.2% B.

9. The powder mixture of claim 8 in which:

each of the alloy powders comprise, by weight, about: 9–11% Cr, 5–7% Al, 0.6–1.3% Ti, 0.7–1.2% Mo, 4.5–5.7% Ta, 2.6–3.4% W, 1.2–2% Hf, 0.05–0.16% C, 0.02–0.08% Zr, 10–14% Co, with the balance Ni and incidental impurities;

the second alloy powder further characterized by the presence, by weight, of about 0.05–2.2% Si and about 0.2–1.2% B.

10. The powder mixture of claim 9 in which:

each of the alloy powders comprise, by weight, about: 9.5–10.5% Cr, 5.7–6.3% Al, 0.8–1.2% Ti, 0.8–1.2% Mo, 4.7–5.3% Ta, 2.8–3.2% W, 1.4–1.7% Hf, 0.09–0.13% C, 0.03–0.07% Zr, 11–13% Co, with the balance Ni and incidental impurities;

the second alloy powder further characterized by the presence, by weight, of about 1.7–2.0% Si and about 0.9–1.1% B.

11. In a method for repairing an article having a body of a high temperature superalloy with a directionally oriented microstructure and a recrystallization temperature of at least about 2275° F., the body having a structural discontinuity at a surface portion thereof, the steps of: providing the powder mixture of claim 8; cleaning the surface portion of the article; and brazing the powder mixture to the surface potion by heating in a non-oxidizing atmosphere at a temperature in the range of about 2275°–2325° F. for about ¼–2 hours.

12. The method of claim 11 in which the brazing is conducted for about ¼–1 hour, the additional steps of:

diffusing the brazed alloy into the surface portion by heating in a non-oxidizing atmosphere at a temperature in the range of about 2075°–2125° F. for about 1–4 hours and then at a temperature in the range of about 2150°–2200° F. for about 1–4 hours to provide a repaired structure; and aging the repaired structure by heating in a non-oxidizing atmosphere at a temperature in the range of about 1600°–1700° F. for a time in the range of about 1–16 hours.

* * * * *